United States Patent [19]

Morimoto et al.

[11] 4,075,125

[45] Feb. 21, 1978

[54] CATALYSTS FOR HYDRODEMETALLIZATION OF HYDROCARBONS CONTAINING METALLIC COMPOUNDS AS IMPURITIES

[75] Inventors: Tatsuo Morimoto, Yokohama; Munekazu Nakamura, Kamakura; Masayoshi Inooka; Teizaburo Yawata, both of Yokohama, all of Japan

[73] Assignee: Chiyoda Chemical Engineering & Construction Co., Ltd., Yokohama, Japan

[21] Appl. No.: 704,020

[22] Filed: July 9, 1976

[30] Foreign Application Priority Data

July 9, 1975 Japan ................................. 50-83580
Sept. 25, 1975 Japan ............................... 50-114807
Sept. 25, 1975 Japan ............................... 50-114808
Sept. 25, 1975 Japan ............................... 50-114809

[51] Int. Cl.² .......................... B01J 29/06; B01J 23/08
[52] U.S. Cl. ............................. 252/455 R; 252/463; 423/628

[58] Field of Search ..................... 252/455 R, 463; 423/121, 625, 628

[56]  References Cited

U.S. PATENT DOCUMENTS

| 3,467,602 | 9/1969 | Koester | 252/455 R |
| 3,551,093 | 12/1970 | Myers et al. | 252/455 R |
| 3,975,496 | 8/1976 | Smalley et al. | 423/121 |

Primary Examiner—Carl F. Dees
Attorney, Agent, or Firm—Armstrong, Nikaido & Marmelstein

[57]  ABSTRACT

A catalyst obtained by admixing red mud with alumina or/and an alumina-containing substance, optionally adjusting the water content of the admixture and/or adding an organic binder to the admixture, kneading and shaping the admixture into pellets having suitable size and shape, and calcining the pellets at 600° to 1,100° C. The catalyst has a high compression strength and can, when used in the hydrodemetallization of hydrocarbons, achieve a high rate of demetallization and a low yield of low boiling fractions. The rate of demetallization is enhanced when the process is carried out using a hydrogen feed containing hydrogen sulfide.

2 Claims, 2 Drawing Figures

CATALYSTS FOR HYDRODEMETALLIZATION OF HYDROCARBONS CONTAINING METALLIC COMPOUNDS AS IMPURITIES

BACKGROUND OF THE INVENTION

Hydrocarbons, such as crude oil, heavy oil, vacuum residue, solvent-deasphalted oil, solvent-deasphalted residue, cracked oil, shale oil, tar sand oil and natural asphalt, contain various non-metallic and metallic impurities, which may adversely affect various processes for treating hydrocarbon fractions thereof. Most of the non-metallic impurities are compounds of nitrogen, sulfur and oxygen, and these are combined with high molecular weight asphaltene compounds and colloidally dispersed in the hydrocarbons. The metallic impurities include compounds of nickel, vanadium, iron, calcium, magnesium, copper, lead and zinc, especially those of nickel and vanadium. These metals are present in the hydrocarbon oils in the form of organo-metallic compounds, such as porphyrins, chelates and naphthenates, or in a form in which such organo-metallic compounds are combined with asphaltenes. Furthermore, the metals may also and present in the hydrocarbons as suspended metal oxides or sulfides, or as water soluble salts. These impurities possibly cause air-pollution problems when hydrocarbons containing the same are used as a fuel, and adversely affect reforming, cracking or other catalytic processes of hydrocarbons, by poisoning the catalysts used in such processes.

Removal of such impurities from hydrocarbons containing the same is an essential requirement in the art, and various processes have heretofore been proposed for removing sulfur and metals from hydrocarbons. The most simple measure to avoid metallic impurities is the use of lower boiling fractions in catalytic processes, based on the established knowledge that the metallic impurities are normally concentrated in higher boiling fractions. Alternatively, based on the knowledge that hydrocarbons in which the metallic impurities have been concentrated are sparingly soluble in certain low boiling solvents, processes are also known in which the hydrocarbons are subjected to a solvent extraction step for a substantial reduction in the metallic impurities. However, each of the processes provides a considerable yield of a residue in which the metallic impurities have been concentrated. In addition to the content of metals, contents of sulfur, nitrogen and asphaltene have also been concentrated in the residue. Such a residue has no valuable use except as the lowest form of fuel oil, which will inevitably invite air-pollution problems. Accordingly, none of the above-mentioned known processes is satisfactory from the viewpoint of full utilization of oils and energy or economics.

For the hydrodemetallization of hydrocarbons, processes have also been proposed in which the hydrocarbons are treated with hydrogen at high temperatures and pressures in the presence of certain catalysts. Such processes have been widely used for the removal of metals from hydrocarbons. Such processes are, however, disadvantageous in that a considerable proportion of the hydrogen used is consumed in side reactions, such as hydrogenating cracking, and in that the catalysts are expensive and the activity of the catalysts is considerably reduced by deposition of the metals thereon (that is, the allowable level of the amount of metals deposited on the catalysts is low). Accordingly, it is desired to develop an inexpensive catalyst having a high activity and a high selectivity for the desired demetallizing reactions. One of the known improved catalysts is disclosed in Japanese Laid-open Patent Specification No. 49(1974) - 122,501 (Japanese Patent Application No. 48(1973) -36,985) for "PROCESS FOR THE REMOVAL OF VANADIUM AND NICKEL FROM HYDROCARBONS", wherein the catalyst is based on red mud. According to the above-mentioned laid-open specification, red mud is used as a catalyst without being subjected to any particular treatment. Thus, the requirement for low cost is satisfied. However, the activity and selectivity of the catalyst for the demetallization are still unsatisfactory. In fact, according to the detailed description and data given in the laid-open specification it will be noted that the hydrogenating cracking reactions occur to a great extent together with the desired demetallizing reactions. That is, the % yield of either $C_1 - C_5$ or $C_5 - 300°$ C fraction is as high as at least several or ten times that obtainable with the conventional desulfurizing catalyst for achieving the same % removal of metals. Furthermore, it is obviously expected from this result that desulfurizing and deasphalting reactions also occur in the process of the above-mentioned laid-open specification, and thus it is believed that the process of the laid-open specification suffers from a considerably high consumption of chemical hydrogen and a fairly vigorous generation of the heat of reaction. Moreover, it should be also noted that the by-production of a higher yield of low boiling oils is accompanied by a larger amount of recirculated purging hydrogen. Thus, in view of the increased amount of hydrogen consumed and the complicated reaction apparatus, both resulting from the low selectivity of the catalyst for the demetallizing reactions, the process of the above-mentioned laid-open specification is not advantageous not only from the viewpoint of technology but also from the viewpoint of economy, although the catalyst used is itself inexpensive. Furthermore, while no reference is made in the laid-open specification with respect to the manner of contacting the reactants with the catalyst, the catalyst is necessarily used in the state of a slurry because the untreated red mud is fine enough to pass through a screen of 300 mesh. Therefore, the reaction apparatus and conditions of the process of the laid-open specification are limited and unflexible.

DETAILED DESCRIPTION OF THE INVENTION

Figure 1:
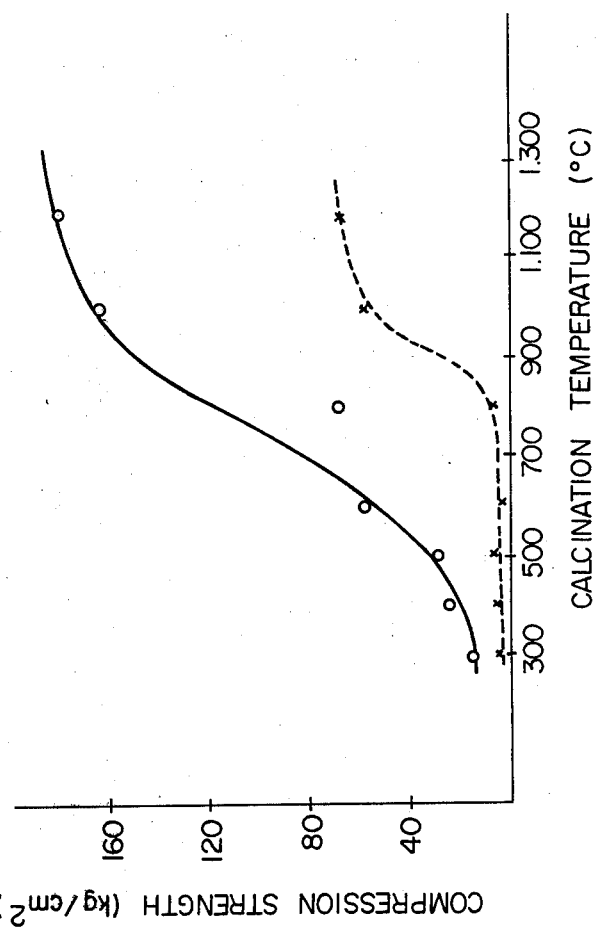

It has now been found that a catalyst obtained by calcining red mud at relatively high temperatures has a high strength and exhibits an excellent selectivity and a high specific activity for the hydrodemetallizing reactions of hydrocarbons. By the term "excellent selectivity" of a catalyst used herein we mean that when the catalyst is used in the process of the invention it can provide a desirably low % yield of a $C_1-C_5$ fraction. By the term "specific activity" of a catalyst used herein is meant that the catalyst can achieve a high % removal of metal (typically vanadium) per unit surface area of the catalyst when used in the process of the invention.

While red mud calcined at relatively high temperatures exhibits desirable catalytic properties as discussed in the preceding paragraph, the use thereof as a commercial catalyst is inconvenient and extremely limited. This is because the calcined red mud is a powdery product. It has now been found that a commercially useful calcined red mud catalyst can be obtained by admixing red mud with alumina or/and an alumina-containing material, optionally adjusting the water content of the resulting mixture and/or adding an organic binder to said mixture, kneading and shaping the mixture into structures of a suitable shape, and calcining the shaped structures at a temperature of 600° C to 1,100° C. The product so obtained can be conveniently use as a catalyst in a commercial process for hydrodemetallization of hydrocarbons containing the same, and exhibits an excellent selectivity and a high specific activity for the demetallizing reactions of hydrocarbons.

Red mud used as a starting material in the preparation of the catalyst according to the invention is an industrial waste material which is by-produced in large quantities as an insoluble residue during a step of extracting sodium aluminate in the so-called Bayer process for refining aluminum from bauxite. Typically the red mud has the following composition:

| Ignition loss | 10 – 12 % by weight |
|---|---|
| $Fe_2O_3$ | 39 – 42 |
| $Al_2O_3$ | 20 – 23 |
| $SiO_2$ | 13 – 15 |
| $Na_2O$ | 7 – 8 |
| $TiO_2$ | 2 – 3 |

While the proportions of the components may vary depending upon the origin of the bauxite as well as upon the conditions employed in the aluminum refining process, variations in the catalytic properties due to variations in the composition of the red mud are normally so low as to be negligible.

It has heretofore been known that the activity of a catalyst in the desulfurizing and demetallizing reactions depends on the size and surface area of pores in the catalyst, and researcher's efforts have been focused on the problem of how to increase the surface area of pores having a proper size. Thus, the temperature at which a catalyst precursor is calcined to provide a catalyst has been selected within an optimum range for the formation of pores or for the kind of catalytic metals to be added normally within a range between about 400° C and about 600° C. Higher calcination temperatures may often result in a product having reduced surface areas of pores and in turn a lower specific activity, as supported by many experimental results which have heretoforce been reported.

With respect to red mud, it is also expected that when a sample of red mud which has been merely dried is calcined at a temperature of 400° C to 600° C, for example at about 500° C, its specific activity will be enhanced to a certain extent. It has been found that a red mud catalyst which has been calcined at a temperature of 600° C to 1,100° C, also exhibits a catalytic activity comparable with that of the corresponding red mud catalyst which has been calcined at a temperature of 500° C. This means that a red mud catalyst which has been calcined at a temperature of 600° C to 1,100° C has a much higher specific activity per unit surface area than that of the corresponding red mud catalyst which has been calcined at a lower temperature, for example, 500° C, since the former catalyst has a much lower specific surface area than the latter.

It is surprising and unexpected from known alumina catalysts that red mud catalysts calcined at a temperature of 600° C to 1,100° C, have a high specific activity for a period of prolonged operation. While a precise mechanism is not yet known, it is believed that with respect to red mud catalysts, active sites on the surface of the catalyst are not appreciably caused to be buried in the body of the catalyst by the reduction in the specific surface area due to the calcination at higher temperatures.

Furthermore when the calcination is carried out at higher temperatures, that is 600° C or higher, active sites on the catalyst which will contribute to the formation of coke-forming precursors can be eliminated or at least reduced, and thus the resultant catalyst does not suffer from undesirable coke formation on the surface thereof during its service. Moreover the higher the calcination temperature, the higher the mechanical strength of the resultant catalyst.

Other advantages obtainable by effecting calcination at high temperatures should also be noted. Since calcination of a catalyst at high temperatures eliminates or greatly reduces active sites on the surface of the catlyst, which contribute to formation of coke-forming precursors, undesirable coke-forming reactions may be controlled upon use of the catalyst. Because of the increased strength of the catalyst, loss of the catalyst during the reaction and at the time of charge and discharge of the catalyst may be greatly reduced. Furthermore, the catalyst may be used in any contact system, including fixed and fluidized beds.

When red mud is shaped into pellets and calcined, the higher the temperature at which the calcination has been carried out, the higher is the compression strength of the calcined pellets obtained owing to sintering of the materials. However, the porosity of the pellets becomes lower. The strength of the calcined pellets also depends on the particle size and water content of the starting red mud.

In accordance with the invention red mud is admixed with alumina, for example, in the form of alumina sol, or with a substance containing alumina such as clay or with a substance capable of yielding alumina under the calcination conditions such as sodium aluminate, and the admixture is shaped and calcined. The amount of the alumina substance added may be in the range of about 1 to 10% by weight of the red mud on a dry basis. When calcined, the alumina additive is sintered together with the red mud component, and enhances the strength of the product without adversely affecting the desirable catalytic properties of the red mud.

In addition to the alumina additive, a minor amount (up to 5% by weight of the dried red mud) of an organic binder, such as starch, carboxymethyl cellulose (CMC) or gum arabic, may be added to the red mud. The organic binder not only enhances the green strength of the shaped pellets but also increases the specific surface area and porosity of the calcined pellets by being burnt upon calcination at temperatures of 600° C or more.

The mixture of red mud with alumina and/or the alumina-containing or yielding substance, and optionally with the organic binder, may be shaped into pellets of any suitable size and shape, such as, a solid or hollow cylinder, or a sphere. FIG. 1 of the attached drawings illustrate curves obtained by plotting the compression strength in kg/cm² of the product against the temperature in ° C at which the calcination has been carried out. The solid line relates to a product in accordance with the invention, while the dotted line relates to the calcination of red mud with no added alumina. From the curves given in FIG. 1 it will be seen that the incorporation of alumina to red mud will substantially improve the compression strength of the calcined product. When the catalyst is to be used in a fixed, moving or fluidized bed, it should have an axial compression strength of at least 50 kg/cm$^2$.

The catalyst of the invention can be prepares as follows. The starting red mud material is processed to adjust its water content to a suitable level for admixing, for example, by drying in a hot air oven. The red mud material so conditioned is then admixed with the alumina material and optionally the organic binder. The admixture is kneaded in a kneader or blender of Werner or planet type, and if desired, the water content is adjusted to provide a paste of a viscoelasticity suitable for the subsequent processing. The paste is then shaped into pellets of a suitable size and shape by means of a press, pelletizer or extruder, and calcined in a furnace. The atmosphere in the furnace is not critical, and may be an oxidizing or reducing gas, steam, or hydrogen sulfide, alone or in combination. The calcination should be carried out at a temperature of at least 600° C. Otherwise the resultant catalyst will have a poor compression strength and undesirable active sites which will contribute to form coke-forming precursors. Accordingly, it is critical to use calcination temperatures of 600° C or higher in order to obtain a catalyst having a satisfactory compression strength and an excellent selectivity for the desired hydrodemetallization. Calcination temperatures higher than about 1,100° C are not advantageous because of excessive sintering, possible damage to materials constituting the calcination furnace and poor heat economy.

Figure 2:
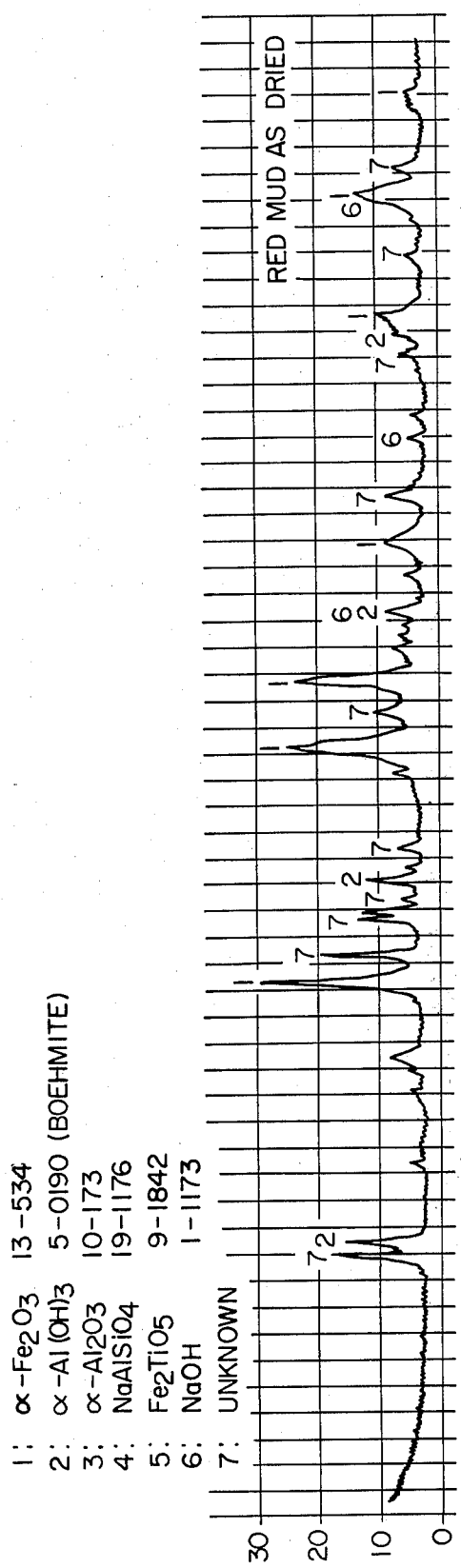
Figure 2:
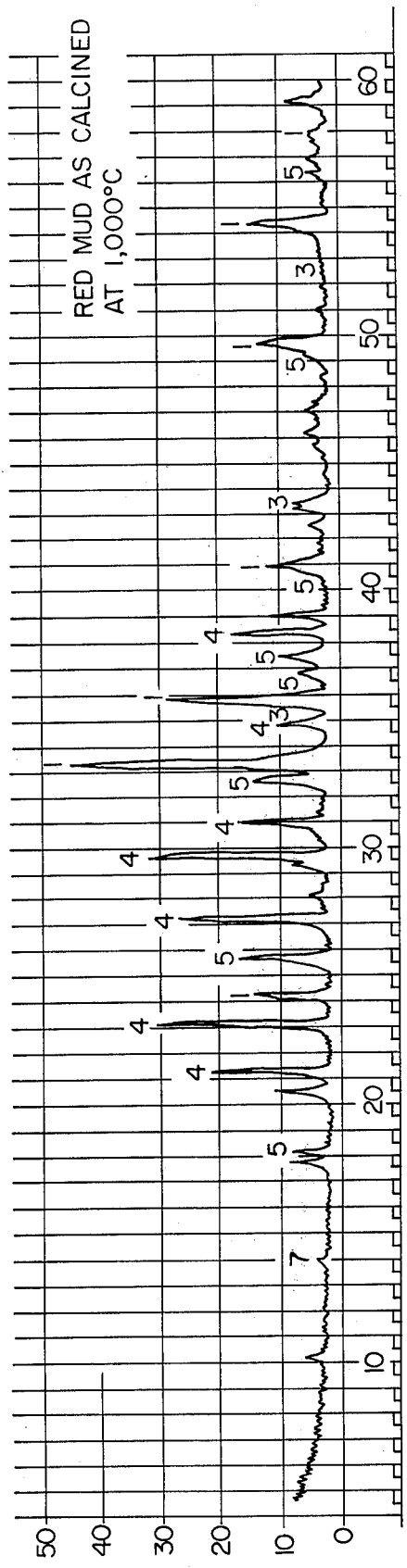

The red mud used in the present invention is an industrial waste, for which new technology for disposal and effective utilization has been and is desired to be developed. Since the catalyst of the invention may be prepared from such a red mud material and inexpensive additives by a simple processing procedure, it is very inexpensive when compared with known demetallizing catalysts wherein a certain catalytic metal is supported on a carrier such as alumina. When compared with a non-calcined red mud, a calcined red mud is characterized in that it has a remarkably improved mechanical strength; it has a reduced specific surface area; since micropores disappear and only macropores remain, it has an extremely increased average pore size; and it has an X-ray diffraction pattern different from that of the non-calcined red mud. All of these differences are believed to contributing to its excellent catalytic properties. FIG. 2 of the attached drawings illustrates X-ray diffraction patterns of non-calcined red mud (the upper one) and calcined red mud (calcined at 1,100° C) samples. The most unexpected facts we have observed are that the calcined red mud, in spite of its reduced specific surface area, has a satisfactory catalytic activity for demetallization which is more durable, that is, the % reduction in catalytic activity with time is lower; and that its activity for hydrogenation and desulfurization is controlled. Thus, the calcined product is essentially distinct from the non-calcined product in that it has an improved durable and specific activity for the demetallization reaction.

It is known in the art that in the hydrodesulfurization and hydrodemetallization of heavy hydrocarbons in the presence of a known desulfurization catalyst, the presence of hydrogen sulfide in general adversely affects the desired reactions. This is not the case with the catalyst of the invention. As seen from the data hereinafter given, the catalyst of the invention has a limited activity for the desulfurization and an improved activity for the demetallization and the demetallizing effect is enhanced by the presence of hydrogen sulfide. Accordingly, it is preferred to carry out the hydrodemetallization while adding hydrogen sulfide. In other words it is not necessary to take any precautions against the presence or generation of hydrogen sulfide in the reaction atmosphere, but it is often desirable to add an amount of hydrogen sulfide to the hydrogen feed.

The calcined catalyst of the invention may be used in the hydrodemetallization process of the invention without any treatment. It is possible, however, to subject it to sulfurization with a suitable sulfurizing agent before it is used in the hydrodemetallization of hydrocarbons.

The hydrodemetallization of hydrocarbons in accordance with the invention may be carried out by contacting hydrogen and the hydrocarbons to be processed with the catalyst of the invention at a temperature of 300° C to 500° C and a hydrogen pressure of 10 to 300 kg/cm$^2$. The rate of feed of the hydrocarbons may widely vary depending on the nature of the hydrocarbons, the content of metal in the hydrocarbons, the rate constant of the catalyst and the amount of the catalyst. In most cases the hydrocarbons may be fed at a rate of 0.1 to 20 parts by volume of hydrocarbons per hour for unit part by volume of the catalyst. The hydrogen is fed usually in an amount of 89 to 1780 Nl of hydrogen per liter of the hydrocarbons.

The process of the invention may be carried out using any known techniques for carrying out catalytic gas-liquid reactions, for example, in a fixed, moving, fluidized or suspended bed of catalyst.

The hydrocarbons which have been processed by the process of the invention and thus have a reduced content of metal will be effectively and advantageously processed in subsequent processes, such as desulfurization, hydrocracking and catalytic cracking, since catalysts used in these subsequent processes will not be exposed to a high metal content.

The invention will be further illustrated by the following non-limitative examples, in which all percentages and parts are by weight unless otherwise specified.

EXAMPLE 1

Hydrous red mud was dried in a drier with hot air at a temperature of 120° C to a water content of 2%. A mixture obtained by adding to the dried red mud about 40 to 50% of water, 3% of CMC and 5% of sodium aluminate, the percentages being based on the dried red mud, was kneaded for 20 minutes in a Werner kneader. The kneaded mixture was then shaped by means of an extrusion pelletizer into cylindrical pellets having different diameters as indicated in Table I below. Samples of the pellets were then calcined for 3 hours at a temperature of 400° C, 600° C, 800° C, 1,000° C or 1,300° C. The properties of the calcined red mud catalysts are shown in Table I below.

Table I

| Calcination Temp. ° C | Size of catalyst mmφ | Specific surface area m$^2$/g | Volume of pores cc/g | Compression strength kg/cm$^2$ |
|---|---|---|---|---|
| 400 | 1.5 | 32 | 0.25 | 22.8 |
| 600 | 1.5 | 13 | 0.23 | 56.1 |
| 800 | 1.5 | 8 | 0.23 | 67.4 |
| 1000 | 1.5 | ca 1.1 | 0.23 | 164.4 |
|  | 3.0 | ca 1.1 | 0.21 | 170.5 |
| 1300 | 3.0 | ca 1 | 0.17 | 178.5 |
|  | 4.5 | ca 1 | 0.17 | 182.0 |

EXAMPLES 2 to 7

Red mud samples as they are (Examples 2 to 4) and those admixed with sodium aluminate (Example 5) or active alumina (Examples 6 and 7), were shaped into spheres of an average diameter of 1.5 mm (Examples 2, 3 and 5 to 7), and then calcined for a period of 5 hours at a temperature of 600° C or 1000° C, as indicated in Table II below.

Each of the catalysts so prepared was charged in a conventional flow type high pressure reactor, and a demetallizing process was carried out with an atmospheric residue using a hydrogen pressure of 140 kg/cm², a reaction temperature of 415° C and a liquid space velocity of 0.5 hr$^{-1}$. The atmospheric residue contained 150 ppm of vanadium, 40 ppm of nickel, 3.0 ppm of iron, 2.87% of sulfur and 0.45% of nitrogen, the content of the oil insoluble in n-heptane being 3.0%.

The results are shown in Table II below.

Table II

| Ex No | Additive | Calcination temp. °C | Size of catalyst mmφ | DVR | Results after continued operation of 50 hrs. | | | | Results after continued operation of 4000 hrs. | |
|---|---|---|---|---|---|---|---|---|---|---|
| | | | | | DNiR | DFeR | DSR | C$_1$–C$_5$ | DVR | C$_1$–C$_5$ |
| 2 | None | 600 | 1.5 | 90% | 70% | 79% | 21% | 0.3% | 64% | 0.2 |
| 3 | None | 1,000 | 1.5 | 85 | 65 | 80 | 12 | 0.2 | 72 | 0.1 |
| 4 | None | 1,000 | 3.0 | 86 | 62 | 77 | 13 | 0.2 | 75 | 0.2 |
| 5 | Sodium aluminate | 600 | 1.5 | 91 | 67 | 75 | 22 | 0.4 | 67 | 0.3 |
| 6 | Active alumina | 600 | 1.5 | 93 | 75 | 82 | 20 | 0.3 | 67 | 0.3 |
| 7 | ibid | 1,000 | 1.5 | 87 | 71 | 81 | 15 | 0.1 | 77 | 0.2 |

Note
DVR: % removal of vanadium
DNiR: % removal of nickel
DFeR: % removal of iron
DSR: % removal of sulfur
C$_1$–C$_5$: % yield of C$_1$–C$_5$ fraction

EXAMPLES 8 and 9

Hydrous red mud was dried in a hot air oven at a temperature of 120° C to a water content of 2%, and then after being shaped into spheres having an average diameter of 1.5 mm was calcined at a temperature of 1,000° C for 5 hours.

The catalyst so prepared was charged in a flow type high pressure reactor and an atmospheric residue as used in Examples 2 to 7 was treated with a liquid space velocity of 0.5 l/hr under the conditions as indicated in Table III below. In Example 9, a waste gas obtained from a hydrodesulfurization process of a vacuum gas oil was used as a source of hydrogen containing hydrogen sulfide. The waste gas contained 5% by volume of hydrogen sulfide and 0.2% by volume of methane.

The results are shown in Table III below.

Table III

| Ex. No. | Hydrogen sulfide | Reaction conditions Hydrogen pressure kg/cm² | Reaction temp. °C | Results after operation of 100 hrs. DVR % | DSR % | C$_1$–C$_5$ % |
|---|---|---|---|---|---|---|
| 8 | not added | 140 | 400 | 63 | 11 | 0.1 |
| 9 | added | 130 | 400 | 71 | 7 | 0.1 |

Note
DVR: % removal of vanadium
DSR: % removal of sulfur
C$_1$–C$_5$: % yield of C$_1$–C$_5$ fraction As noted from the data shown in Table III, the addition of hydrogen sulfide to the hydrogen feed appreciably enhances the % removal of vanadium.

While not shown in Table III above, % removals of nickel and iron achieved in Example 9 were 56% and 75%, respectively, which were respectively higher than those achieved in Example 8.

EXAMPLES 10 to 13

Using a catalyst prepared in the same manner as in Example 3, each of a vacuum residue containing 350 ppm of vanadium, a solvent-deasphalted oil containing 52 ppm of vanadium, a tar sand oil containing 135 ppm of vanadium and a cracked gas oil from asphalt containing 11 ppm of vanadium was demetallized under conditions indicated in Table IV below. The results are also shown in the same table.

Table IV

| Ex. No. | Oils treated | Hydrogen pressure kg/cm² | Reaction temp. °C | Space velocity hr$^{-1}$ | Results after 500 hr operation | | |
|---|---|---|---|---|---|---|---|
| | | | | | DVR % | C$_1$–C$_5$ % | Consumed hydrogen l/l |
| 10 | Vacuum residue | 140 | 415 | 0.2 | 83 | 0.2 | 20 |
| 11 | Deasphalted oil | 100 | 400 | 1.0 | 85 | 0.1 | 15 |
| 12 | Tar sand oil | 140 | 420 | 0.5 | 77 | 0.3 | 18 |
| 13 | Cracked gas oil | 140 | 400 | 1.0 | 90 | 0.1 | <7 |

As seen from Table IV, the used catalyst controls the undesirable formation of a C$_1$–C$_5$ fraction and exhibits a high % removal of vanadium with less consumption of chemical hydrogen.

EXAMPLES 14 to 17

Each of the demetallized oils obtained in Examples 10 to 13 was subjected to a hydrodesulfurization process using a commercial catalyst which was widely used in hydrodesulfurization processes. The conditions used and the results are shown in Table V below.

Table V

| Ex. No. | Oil from | Catalyst | Hydrogen pressure kg/cm² | Reaction temp. °C | % Removal of sulfur after 100 hrs. % | % Removal of sulfur after 1,000 hrs. % |
|---|---|---|---|---|---|---|
| 14 | Ex. 10 | A | 140 | 400 | 81 | 77 |
| 15 | Ex. 11 | B | 100 | 390 | 95 | 92 |
| 16 | Ex. 12 | A | 140 | 410 | 75 | 70 |
| 17 | Ex. 13 | C | 100 | 380 | 97 | 96 |

Note
A: a catalyst for desulfurizing residual oils
B: a catalyst for desulfurizing vacuum gas oils
C: a catalyst for desulfurizing gas oils

What is claimed is:

1. A catalyst for hydrodemetallization of hydrocarbons containing metallic compounds as impurities, said catalyst having been prepared by a process wherein red mud is admixed with alumina or/and an alumina-containing substance in a amount of from 1 to 10% by weight based on the weight of the red mud, shaped and calcined at a temperature of 600° C to 1,100° C.

2. A catalyst in accordance with Claim 1 in which an organic binder together with said alumina or/and said alumina-containing substance is admixed with said red mud.

* * * * *